United States Patent
Munkberg et al.

(10) Patent No.: US 9,390,550 B2
(45) Date of Patent: Jul. 12, 2016

(54) CULLING FOR HIGHER-ORDER MOTION BLUR RASTERIZATION

(71) Applicant: Intel Corporation, Santa Clara, CA (US)

(72) Inventors: Carl J. Munkberg, Malmo (SE); Jon N. Hasselgren, Bunkeflostrand (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 14/056,131

(22) Filed: Oct. 17, 2013

(65) Prior Publication Data

US 2014/0313194 A1 Oct. 23, 2014

Related U.S. Application Data

(60) Provisional application No. 61/813,235, filed on Apr. 18, 2013.

(51) Int. Cl.
*G06T 15/30* (2011.01)
*G06T 15/40* (2011.01)
*G06T 13/20* (2011.01)

(52) U.S. Cl.
CPC .............. *G06T 15/30* (2013.01); *G06T 15/405* (2013.01); *G06T 13/20* (2013.01)

(58) Field of Classification Search
None
See application file for complete search history.

(56) References Cited

U.S. PATENT DOCUMENTS

| | | | | |
|---|---|---|---|---|
| 7,385,612 | B1* | 6/2008 | Peterson | G06T 3/0093 345/581 |
| 7,847,798 | B1* | 12/2010 | Parenteau | G06T 15/405 345/422 |
| 8,854,377 | B2* | 10/2014 | Clarberg | G06T 13/80 345/473 |
| 2012/0218264 | A1* | 8/2012 | Clarberg | G06T 13/80 345/420 |
| 2012/0299910 | A1* | 11/2012 | Liang | G06T 15/405 345/419 |
| 2012/0327071 | A1* | 12/2012 | Laine | G06T 15/30 345/418 |
| 2013/0128324 | A1* | 5/2013 | Kurilin | G06K 9/34 358/538 |
| 2013/0265301 | A1 | 10/2013 | Munkberg | |
| 2014/0015835 | A1 | 1/2014 | Akenine-Moller | |

OTHER PUBLICATIONS

Tomas et al ("Stochastic rasterization using time-continuous triangles", Proceedings of the 22nd ACM SIGGRAPH/EUROGRAPHICS symposium on Graphics hardware pp. 7-16; Eurographics Association Aire-la-Ville, Switzerland, Switzerland © 2007).*
U.S. Appl. No. 14/119,977, filed Nov. 25, 2013 entitled "Culling Using Linear Bounds for Stochastic Rasterization".
Akenine-Moller, T., et al., "Stochastic Rasterization using Time-Continuous Triangles", In Proceedings of Graphics Hardware, 11 pages.
Laine, S., et al., "Clipless Dual-Space Bounds for Faster Stochastic Rasterization", ACM Transactions on Graphics, 2011, vol. 30, No. 4, Article 106, 6 pages.

(Continued)

*Primary Examiner* — Mark Zimmerman
*Assistant Examiner* — Nurun N Flora
(74) *Attorney, Agent, or Firm* — Trop Pruner & Hu, P.C.

(57) ABSTRACT

Efficient overlap tests between a screen space tile and a moving triangle with per-vertex motion following Bézier curves report conservative time bounds in which the moving triangle overlaps with a tile. The tests can be used in designing efficient hierarchical traversal algorithms for higher order motion blur rendering.

27 Claims, 9 Drawing Sheets

(56) References Cited

OTHER PUBLICATIONS

Munkberg, J., et al., "Hyperplane Culling for Stochastic Rasterization", In Eurographics—Short Papers 4 pages.

Munkberg, J., et al., "Hierarchical Stochastic Motion Blur Rasterization", In High Performance Graphics, 11 pages.

Peters, J., "Mid-Structures Linking Curved and Linear Geometry", in SIAM Conference on Geometric Design and Computing.

* cited by examiner

CULLING FOR HIGHER-ORDER MOTION BLUR RASTERIZATION

CROSS REFERENCE TO RELATED APPLICATION

This is a non-provisional application claiming priority to provisional application Ser. No. 61/813,235 filed Apr. 18, 2013, hereby expressly incorporated by reference.

BACKGROUND

Higher order motion blur may be required to faithfully capture object rotations and long-exposure renderings. Higher order motion blur comes at a significant cost. The sample coverage test is more expensive, and a large number of samples per pixels (distributed in time) are needed to carefully capture non-linear motion effects. It is, therefore, desirable to reduce the number of sample tests. Unfortunately, previous algorithms for linear per-vertex motion blur have low culling ratios for highly non-linear motion.

BRIEF DESCRIPTION OF THE DRAWINGS

Some embodiments are described with respect to the following figures.

DETAILED DESCRIPTION

Efficient overlap tests between a screen space tile and a moving triangle with per-vertex motion following Bézier curves report conservative time bounds in which the moving triangle overlaps with a tile. The tests can be used in designing efficient hierarchical traversal algorithms for higher order motion blur rendering.

An overlap test between a screen space tile and a vertex moving along a Bézier curve may be derived. The intersection of a triangle vertex and a tile frustum plane is expressed as a surface, parameterized in time and the plane's intersection with the x-axis. Subdividable linear efficient function enclosures (SLEFES) and two or more adjacent bilinear patches may be used for a tight, lower bound of the surface. The reason tight bounds are important is that motion along Bézier curves is highly non-linear (by design), and finer bounds than for the case of linear per-vertex motion, used in prior art are advantageous in some embodiments. With this representation, an efficient culling test can be expressed for each screen space tile.

Figure 1:
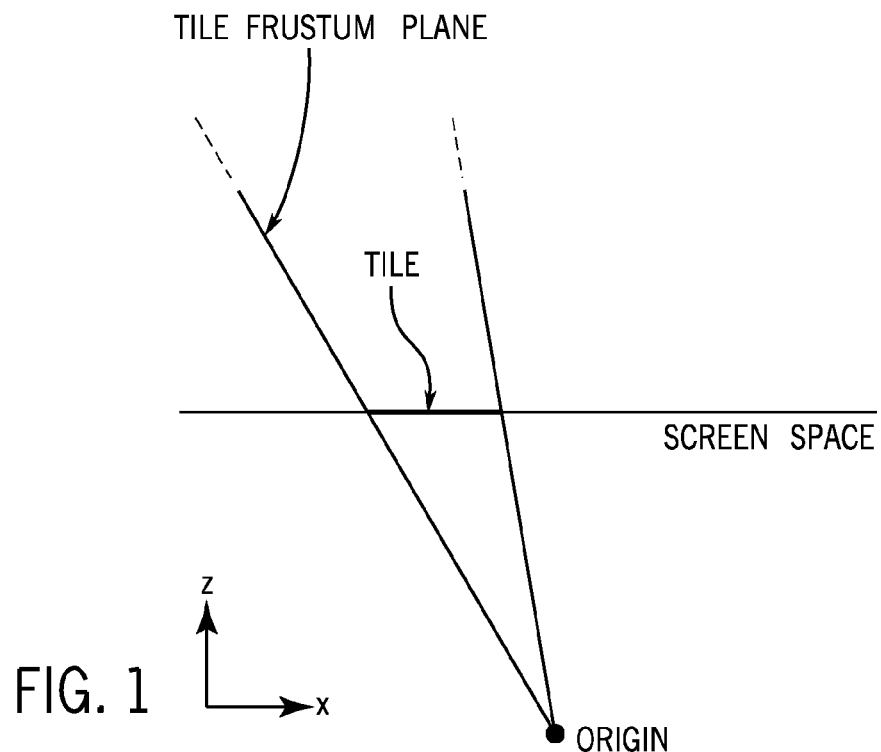
FIG. 1 is a depiction of a frustum plane aligned with a tile side shown in the xz plane.
Figure 2:
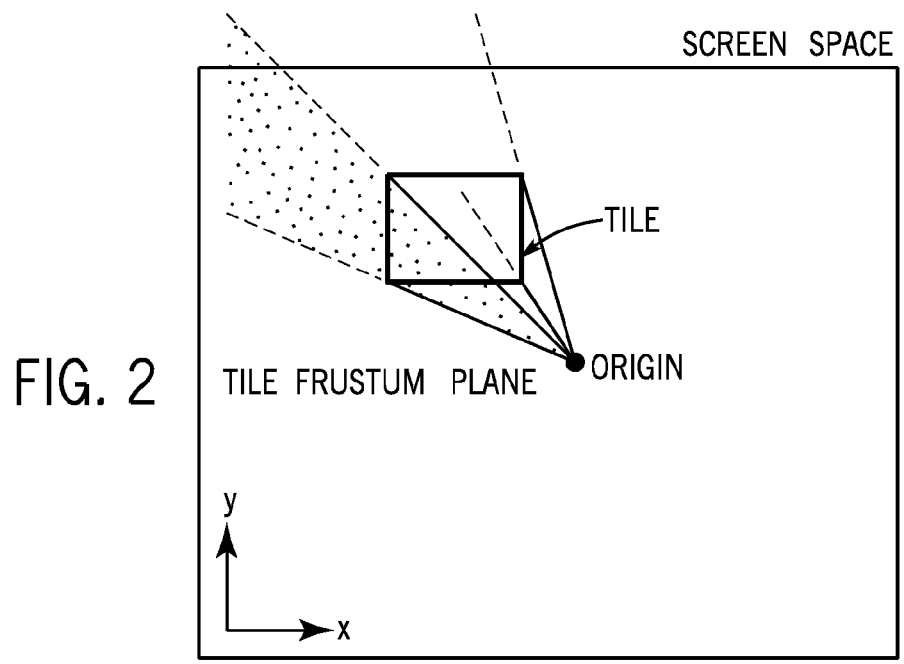
FIG. 2 is a depiction of a frustum plane aligned with a tile side shown in the xy plane.

Based on a tile on screen, four tile frustum planes aligned with the sides of the tile (see FIG. 1 and FIG. 2) are set up in one embodiment. In FIG. 2 a tile in screen space, i.e., the xy-plane, defines a frustum in three-dimensional space. Each of the four sides of the tile extends into a tile frustum plane, and the intersection of these make up the frustum. FIG. 1 shows the situation from the side (looking along the y-axis) (projected onto the xz-plane), and FIG. 2 shows the same geometry from the xy-plane. When working in two-dimensional (2D) homogeneous coordinates, the z-axis is replaced by w, and the planes are defined in xyw-space. Each frustum plane, $\pi_i$, is defined by its plane equation $n_i \cdot p=0$, where $n_i$ is the frustum plane's outward normal (note that these four planes goes through the origin).

Figure 3:
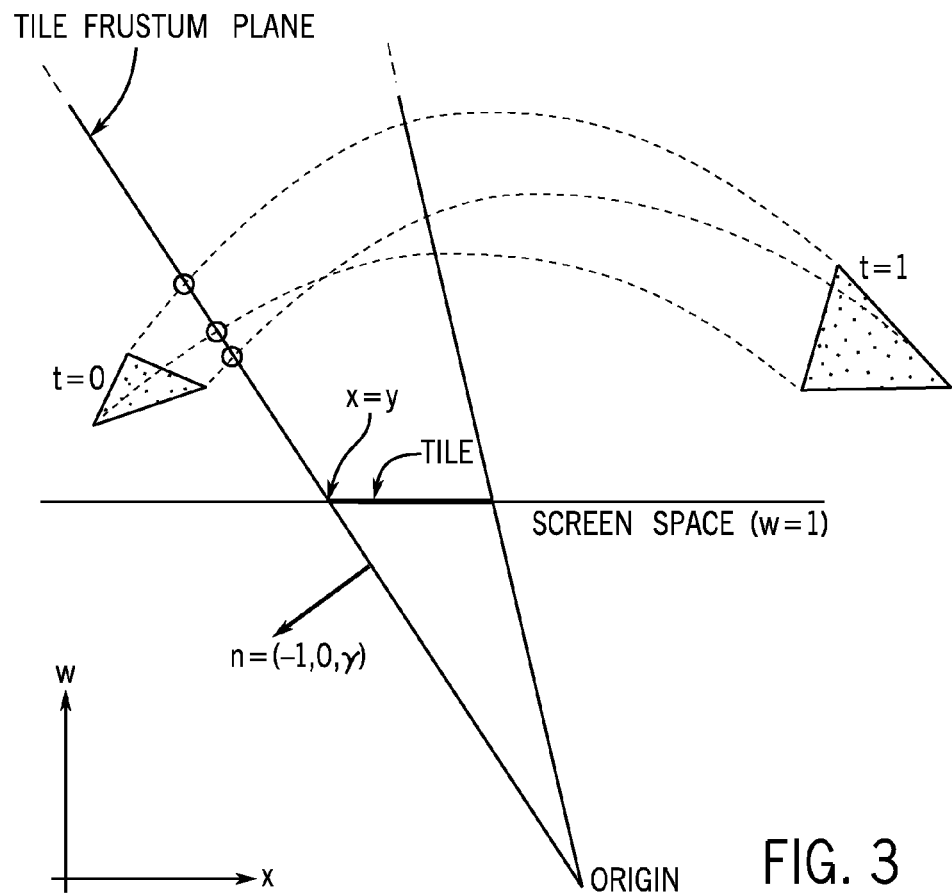
FIG. 3 shows a tile in screen space with its two frustum planes bounding the x-extents of the tile.

FIG. 3 shows a tile in screen space and its two frustum planes bounding the x-extents of the tile. The left frustum plane, passing through the point $(\gamma,0,1)$ has a normal in direction $n=(-1,0,\gamma)$. The intersections of the three moving triangle vertices with this plane (marked as circles on the tile frustum plane) are searched for. A point p is outside the plane if $n_i \cdot p > 0$. If a point is inside all the frustum planes, then it is inside the frustum.

The intersection of the frustum planes against a vertex $p(t)$ moving along a Bézier curve in three-dimensions is found. If the triangle's three vertices all are outside a frustum plane in an interval $t \in [a, b]$, testing any samples within that time interval may be ignored.

The intersection of a Bézier curve $p(t)=\Sigma B_j(t)c_j$ and a plane $n_i \cdot p=0$ through the origin is given by:

$$\Sigma_j B_j(t) n_i \cdot c_j = 0, \quad (1)$$

which is a scalar polynomial equation of the same degree as the Bézier curve $p(t)$.

Now, the intersection with the plane passing through the left side of the tile is studied. The normal of the left tile frustum plane has y-coordinate zero. As shown in FIG. 3, the screen space x-coordinate may be parameterized by $\gamma \in [-1,1]$. The normal vector then becomes $n_i = (-1,0,\gamma)$ in clip space.

This normal is inserted in Equation (1):

$$\Sigma_j B_j(t) n_i \cdot c_j = 0$$

$$\Sigma_j B_j(t)(-1,0,\gamma) \cdot c_j = 0$$

$$\Sigma_j B_j(t)(-c_{j_x} + \gamma c_{j_w}) = 0$$

$$\Sigma_j B_j(t) d_j(\gamma) = 0$$

Note that the notation $d_j(\gamma) = -c_{j_x} + \gamma c_{j_w}$ is introduced in the last step. The equation $\Sigma_j B_j(t) d_j(\gamma)$ is a height field function $s(t,\gamma)s: R^2 \to R$ that is linear in $\gamma$ and has the same degree as the Bézier curve in t. Now, for a unique value of $\gamma = \gamma'$, we want to solve $s(t,\gamma')=0$ for t.

One option is to, for each tile, interpolate each scalar control point to $d_j(\gamma') = -c_{j_x} + \gamma' c_{j_w}$, and find the solution in time to the polynomial equation $\Sigma_j B_j(t) d_j(\gamma') = 0$.

A less expensive tile test can be designed by bounding $s(t,\gamma)$ from below at $\gamma=-1$ and $\gamma=1$ with SLEFES, and then linearly interpolate these bounds in $\gamma$.

Figure 4:
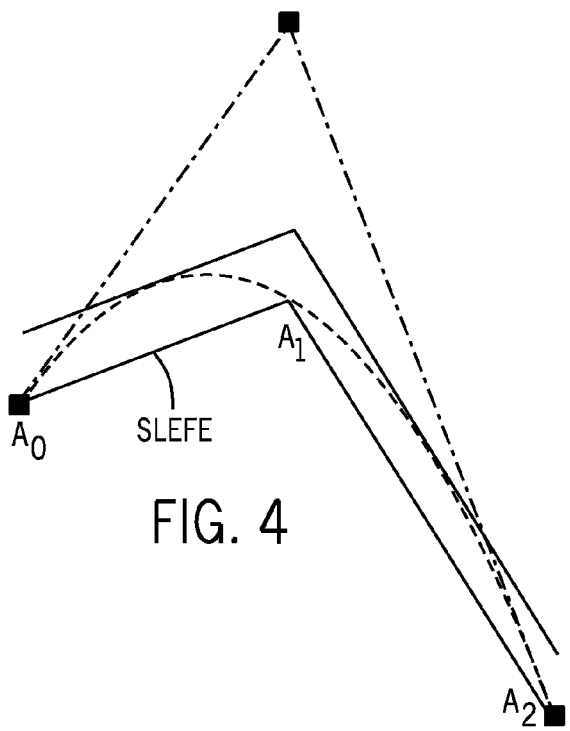
FIG. 4 is an illustration of SLEFES around a quadratic Bézier curve.

Consider the case of quadratic vertex motion. Our technique generalizes easily to higher-order motion, but we describe the case of quadratic vertex motion as an example. Here, the Bézier curve $s(t,-1) = \Sigma_j B_j(t) d_j(-1)$ is bounded from below using SLEFES which results in two linear segments with breakpoints $(0, A_0)$, $(0.5, A_1)$ and $(1, A_2)$. FIG. 4 is an illustration of SLEFES around a quadratic Bézier curve. The $A_i$ coefficients represent breakpoints of the lower SLEFE. Note that in this case, the SLEFES are considerably tighter than the convex hull of the control points. The curve $s(t,1) = \Sigma_j B_j(t) d_j(1)$ is bounded similarly to obtain the breakpoints $(0, B_0)$, $(0.5, B_1)$ and $(1, B_2)$.

Figure 5:
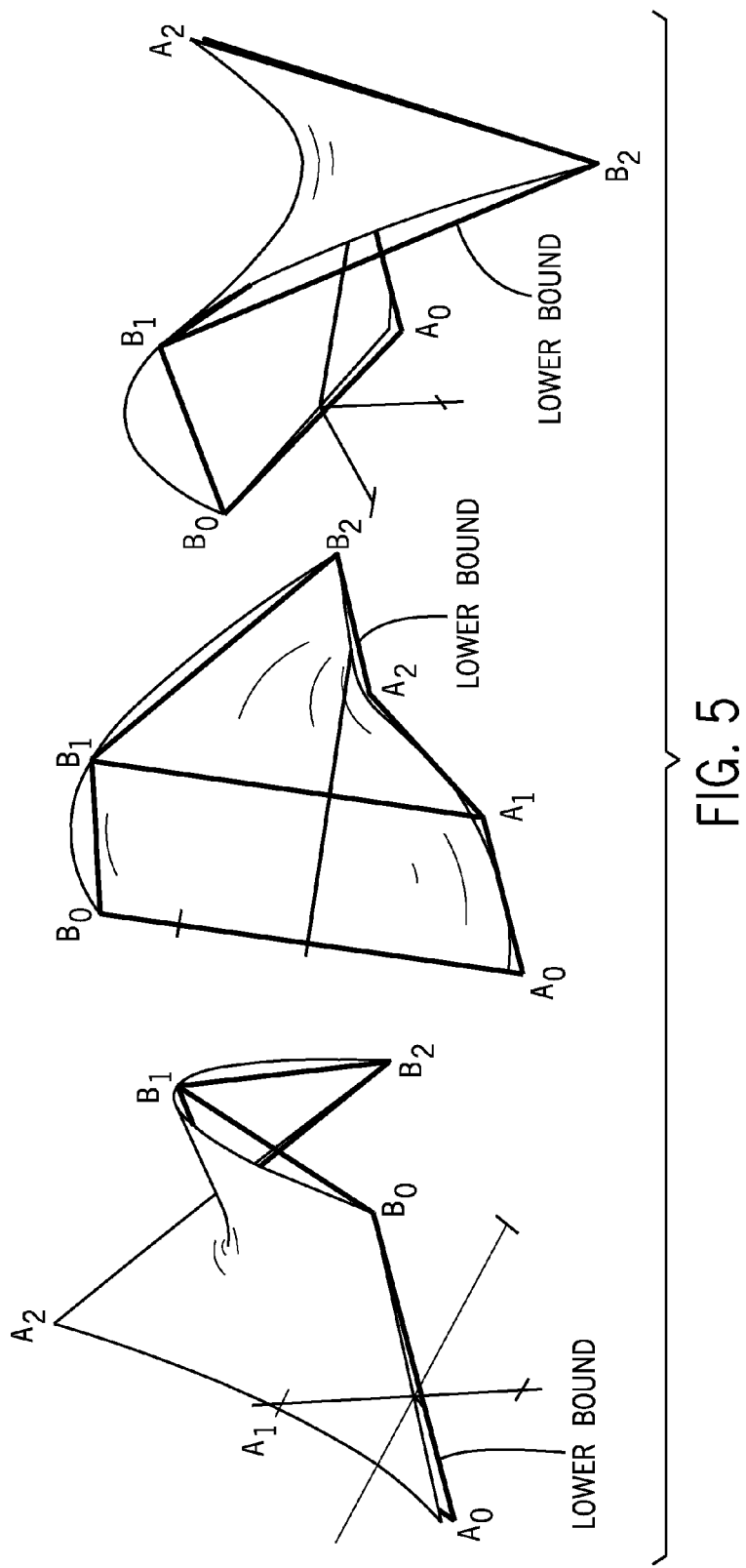
FIG. 5 shows three views of a surface with lower bounds.
Figure 6:
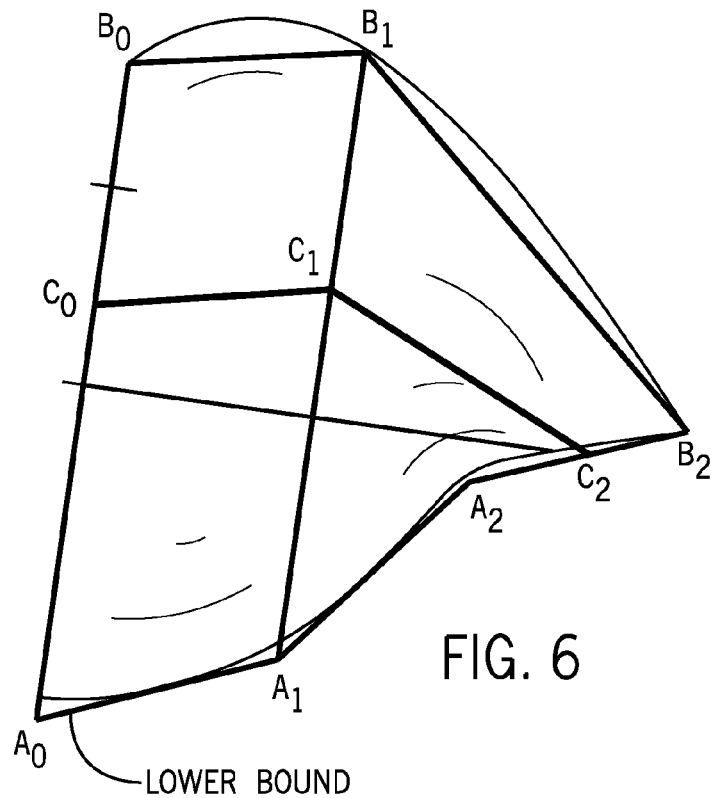
FIG. 6 shows a surface with a lower bound.

Now, a conservative lower bound of the surface $s(t,\gamma)$ is obtained by linearly interpolating these breakpoints. FIG. 5 shows three views of a surface with the lower bound labelled and indicated by straight lines. Note that the lower bound consists of two bilinear patches for quadratic per-vertex motion. The $A_i$ coefficients represent breakpoints of the lower sieve at $\gamma=-1$ and $B_i$ at $\gamma=1$. For a certain value of $\gamma=\gamma'$, linearly interpolate between the bounds according to $C_i(\alpha)=A_i+\alpha B_i$ ($\alpha=0.5*(\gamma'+1)$, i.e., a remaps $\gamma'$ from $[-1,1]$ to $[0,1]$), to obtain two linear segments, as shown in FIG. 6:

$$l_0(t)=(1-t)C_0(\gamma')+tC_1(\gamma') \quad (2)$$

$$l_1(t)=(1-t)C_1(\gamma')+tC_2(\gamma'). \quad (3)$$

Finally, these equations are solved for the (up to two) t-values where $l_i(t)=0$. In FIG. 6, a surface with the lower bound (labelled) is shown. The lower bound consists of two bilinear patches for quadratic per-vertex motion. The $A_i$ coefficients represent breakpoints of the lower SLEFE at $\gamma=-1$ and $B_i$ the corresponding coefficients at $\gamma=1$. The $C_i$ coefficients ($C_0, C_1, C_2$) represent a piecewise linear bound valid for a specific gamma value. The $C_i$'s are obtained by linear interpolation of $A_i$ and $B_i$.

The coefficients $A_i$ and $B_i$ can be pre-computed once at triangle setup, and only the $C_i$ coefficients need to be computed per tile (three lerps for the case of quadratic motion). Also, instead of evaluating the test at both the left and right tile border, one can pad the $A_i$ and $B_i$ coefficients based on the tile extents, and only evaluate a test at the center of each tile.

Figure 8:
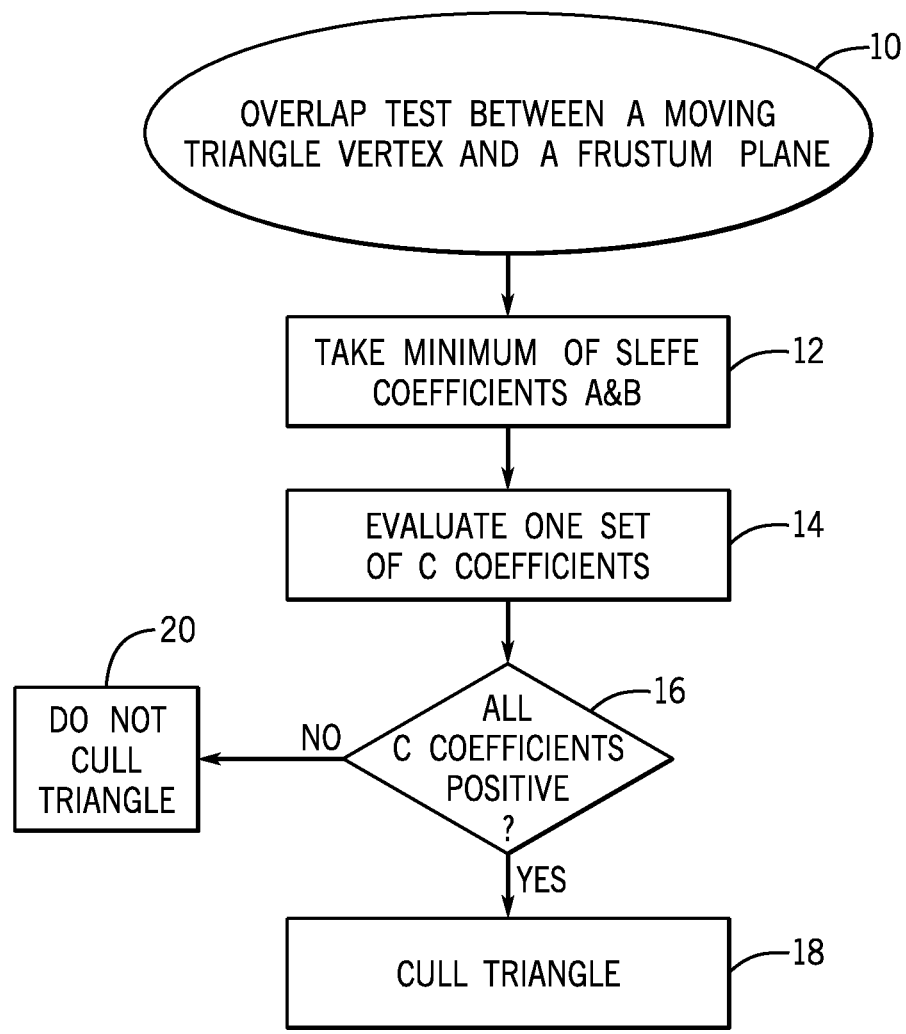
FIG. 8 is a flow chart for one embodiment.

The sequence 10, shown in FIG. 8, for a moving vertex against a tile edge test may be implemented in software, firmware and/or hardware. In software and firmware embodiments, it may be implemented by computer executed instructions stored in one or more non-transitory computer readable media, such as magnetic, optical, or semiconductor storages. In one embodiment, it may be implemented by a graphics processing unit.

To generalize the test 10 from a vertex to a triangle shown in FIG. 8, take the minimum of the SLEFE coefficients $A_i$ and $B_i$ for the three triangle vertices (block 12), and evaluate one set of $C_i$ coefficients for the triangle (block 14). If all $C_i$ are positive for a frustum plane (diamond 16), the triangle is outside and the triangle can be culled for that tile (block 18). Otherwise the triangle is not culled (block 20).

Figure 9:
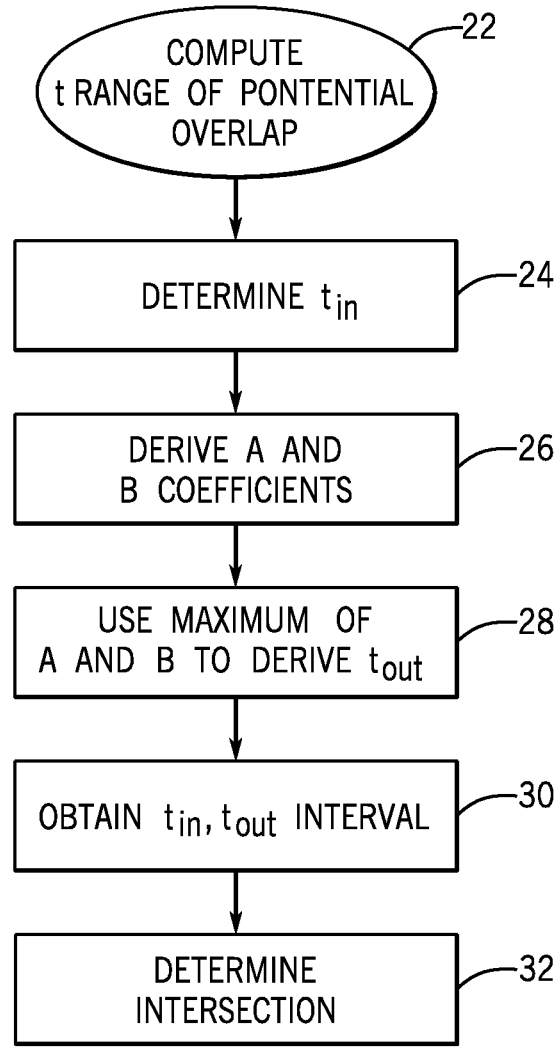
FIG. 9 is a flow chart for another embodiment.

A sequence to compute a t-range of potential overlap, shown in FIG. 9, may be implemented in software, firmware and/or hardware. In software and firmware embodiments, it may be implemented by computer executed instructions stored in one or more non-transitory computer readable media, such as magnetic, optical, or semiconductor storages. In one embodiment, the instructions or the hardware may be part of a graphics processing unit.

To compute a t-range of potential overlap (FIG. 9), the time $t_{in}$ when the triangle first enters the tile frustum (block 24) and a time $t_{out}$ when the triangle leaves the tile frustum (see FIG. 3 for an example) are determined (block 26). One can derive $t_{in}$ from the solutions to $l_i(t)=0$. To obtain $t_{out}$, proceed as above, but use the upper SLEFE to derive the $A_i$ and $B_i$ coefficients (block 26), and use the maximum of $A_i$ and $B_i$ for the three triangle vertices (block 28). With this, an interval $[t_{in}, t_{out}]$ is obtained for when the triangle overlaps with the tile's range in x (block 30). The same procedure is then executed for the two tile frustum planes bounding the tile's range in y to obtain another interval in t. Finally, the intersection of these two intervals is a conservative interval of potential overlap (block 32).

Instead of bounding using $\gamma=-1$ and $\gamma=1$, the extents of the triangle's screen space bounding box may be used when computing the SLEFE coefficients $A_i$ and $B_i$. This may result in tighter bounds. The technique described above generalizes to motion along Bézier curves of degree n, where there will be n piecewise linear segments, and up to n t-values where $l_1(t)=0$.

Based on the breakpoints from the SLEFE-bounds, one can also design an efficient trivial reject test:

```
bool CullAgainstTile( ) {
    foreach tile frustum plane
        bool cull = true;
        foreach vertex p(t)
            interpolate breakpoint: c_i
            foreach c_i
                cull &= c_i > 0
            if (cull) return true;
    return false;
}
```

For a small triangle, where we only have one lower bound for the triangle, instead of for each vertex, the trivial reject test can be written more efficiently:

```
bool CullSmallTriAgainstTile( ) {
    foreach tile frustum plane
        bool cull = true;
        interpolate breakpoint: c_i
        foreach c_i
            cull &= c_i > 0
        if (cull) return true;
    return false;
}
```

When a triangle's vertices move linearly in three dimensions, each triangle edge sweeps out a bilinear patch. The corresponding time-dependent edge functions are quadratic in t. The time-dependent edge equation may be generalized to higher order motion.

To determine if a screen-space tile overlaps with the moving triangle, one can check if the tile are outside any of the triangle's three time-dependent edges. Also, one can determine reduced time ranges in which the triangle overlaps the tile.

A vertex with higher order motion can be represented as a Bézier curve, $$p(t)=\Sigma_j B_j(t)c_j, \quad (4)$$

where $B_j(t)$ are the Bernstein polynomials and $c_j$ are the control points.

The corresponding edge equation between two vertices $p_a(t)=\Sigma_i^n B_i^n(t)a_i$, and $p_b(t)=\Sigma_j^n B_j^n(t)b_j$ is given by:

$$e(t) = \left(\sum_i B_i(t)a_i \times \sum_j B_j(t)b_j\right) \cdot (x, y, 1)$$

$$= \sum_{i,j} B_i(t)B_j(t)(a_i \times b_j) \cdot (x, y, 1)$$

$$= \sum_{i,j} \frac{\binom{n}{i}\binom{n}{j}}{\binom{2n}{i+j}} B_{i+j}^{2n}(t)(a_i \times b_j) \cdot (x, y, 1)$$

-continued $$\left[k = i+j, c_k = \sum_{i+j=k} \frac{\binom{n}{i}\binom{n}{j}}{\binom{2n}{i+j}} a_i \times b_j\right]$$

$$= \sum_k B_k^{2n} c_k \cdot (x, y, 1).$$

As can be seen, this is a Bézier curve of degree 2n.

As an example, for quadratic per-vertex motion, the control points $c_k$ for the moving edge are:

$$c_0 = a_0 \times b_0$$

$$c_1 = \frac{1}{2} a_0 \times b_1 + \frac{1}{2} a_1 \times b_0$$

$$c_2 = \frac{1}{6} a_0 \times b_2 + \frac{4}{6} a_1 \times b_1 + \frac{1}{6} a_2 \times b_0$$

$$c_3 = \frac{1}{2} a_1 \times b_2 + \frac{1}{2} a_2 \times b_1$$

$$c_4 = a_2 \times b_2$$

Figure 7:
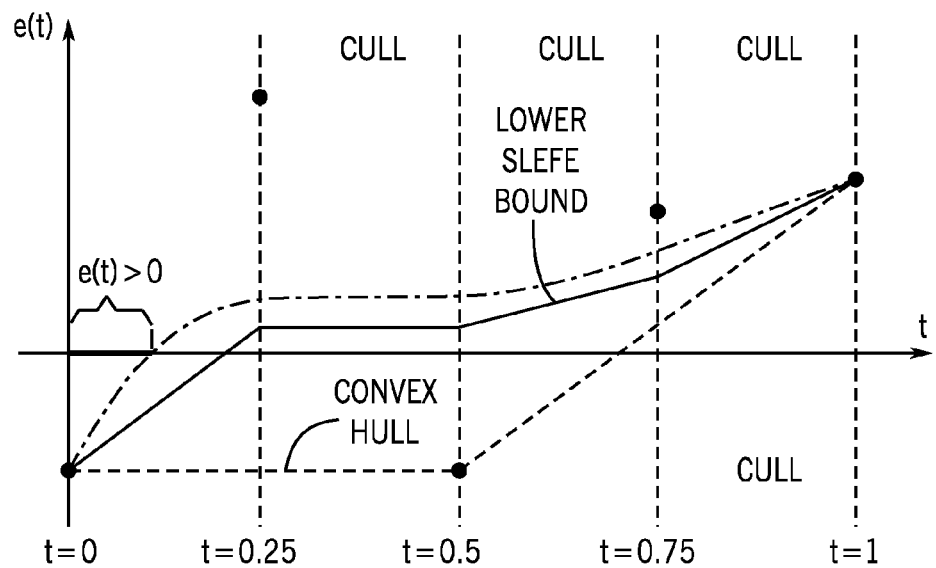
FIG. 7 illustrates solving for $e(t)<0$.

FIG. 7 illustrates a conservative way of solving for where e(t)<0. By finding a lower SLEFE bound for the edge equation, one can cull more regions than the convex hull derived from the curve's control points. The analytical region where e(t)<0 is marked in FIG. 7.

Figure 10:
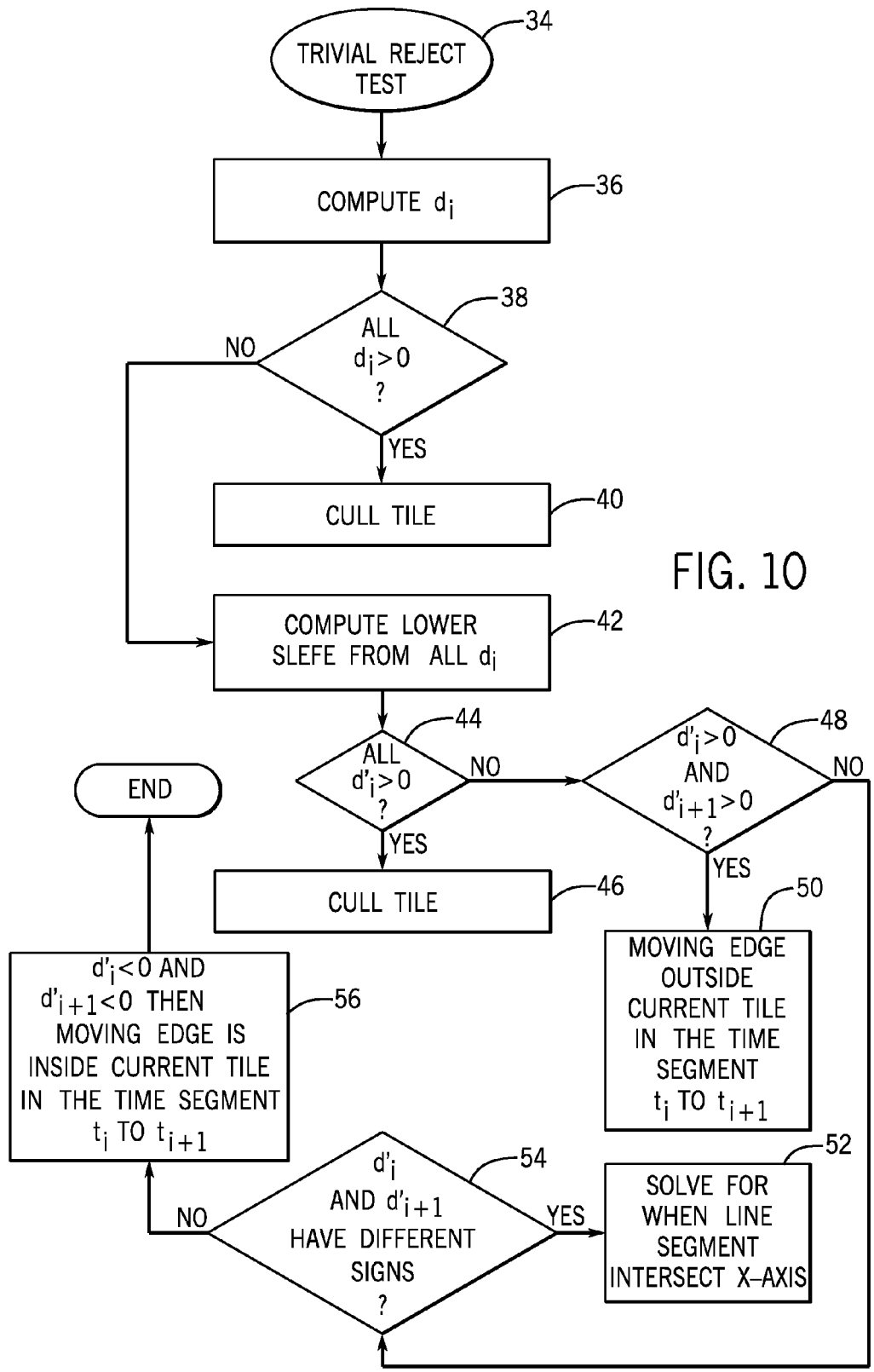
FIG. 10 is a flow chart for another embodiment.

A trivial reject test 34, illustrated in FIG. 10, for a moving edge against a screen space tile, when the edge's vertices moves along a Bézier curves of degree n is described herewith. As shown below, for the case of vertex motion following a Bézier curve of degree n, the corresponding edge equation is now of degree 2n. At triangle setup, we compute the 2n+1 control points $c_i$ (following the derivation for higher order edge equations above) for this edge. Then, for each tile:

1. Compute the 2n+1 scalar control points $d_i = c_i \cdot (x,y,1)$ (block 36). The overlap with the tile and the triangle edge is determined by when the Bézier curve $B_i(t)d_j$ is less than zero.

2. If all $d_i > 0$ (diamond 38) the tile can be culled (block 40).

3. Compute a lower SLEFE from all $d_i$ to obtain 2n+1 breakpoints $d_i'$ (block 42).

4. If all $d_i' > 0$ (diamond 44) the tile can be culled (block 46).

5. if $d'_i > 0$ and $d'_{i+1} > 0$ (diamond 48) the moving edge is outside the current tile within the interval $t_i = [i, i+1]/2n$ (block 50). This step is illustrated in FIG. 7.

6. If not at diamond 48, then check whether $d_i'$ and $d'_{i+1}$ have different signs (diamond 54). If so, solve for when the line segment intersects the x-axis within that time interval.

7. If not at diamond 54, if $d_i' < 0$, $d'_{i+1} < 0$ then moving edge is inside current tile in the time segment $t_i$ to $t_{i+1}$ (block 56). Conservative times of intersections can be obtained by solving for when the line segments $(d_i, i/2n)$: $(d_{i+1}, (i+1)/2n)$ intersects the x-axis (block 52). There is no need to evaluate the edge equation at all four tile corners, if the control points are padded at triangle setup. Let half the tile width (height) be denoted $\Delta_w$ ($\Delta_h$), with $\Delta = )(\Delta_w, \Delta_h, 0)$:

$$c_i \cdot (p \pm \Delta) \geq c_i \cdot p - (|c_{i_x}| \Delta_w + |c_{i_y}| \Delta_h) \quad (5)$$

The second term is independent of p, so that term may be subtracted from the w component of $c_i$ at the triangle setup, and only $c_i \cdot p$ is evaluated per tile to get a conservative lower bound over the tile.

For clarity of presentation, the culling tests described in this disclosure have been described for the case of quadratic per vertex motion, but these tests generalize easily to higher order motion.

Figure 11:
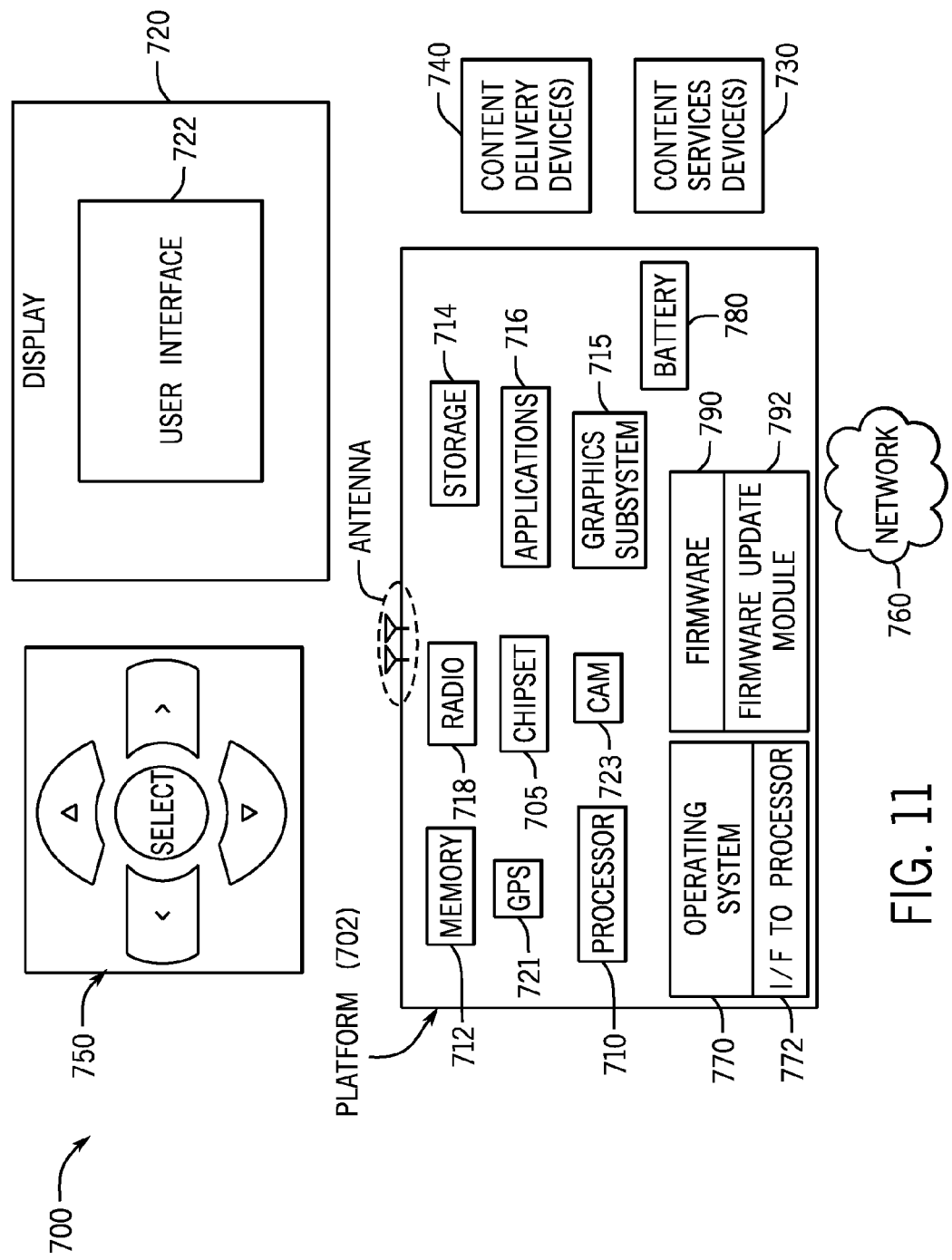
FIG. 11 is a system depiction for one embodiment.

FIG. 11 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 8-10 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 300 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 8-10 in software and/or firmware embodiments.

Figure 12:
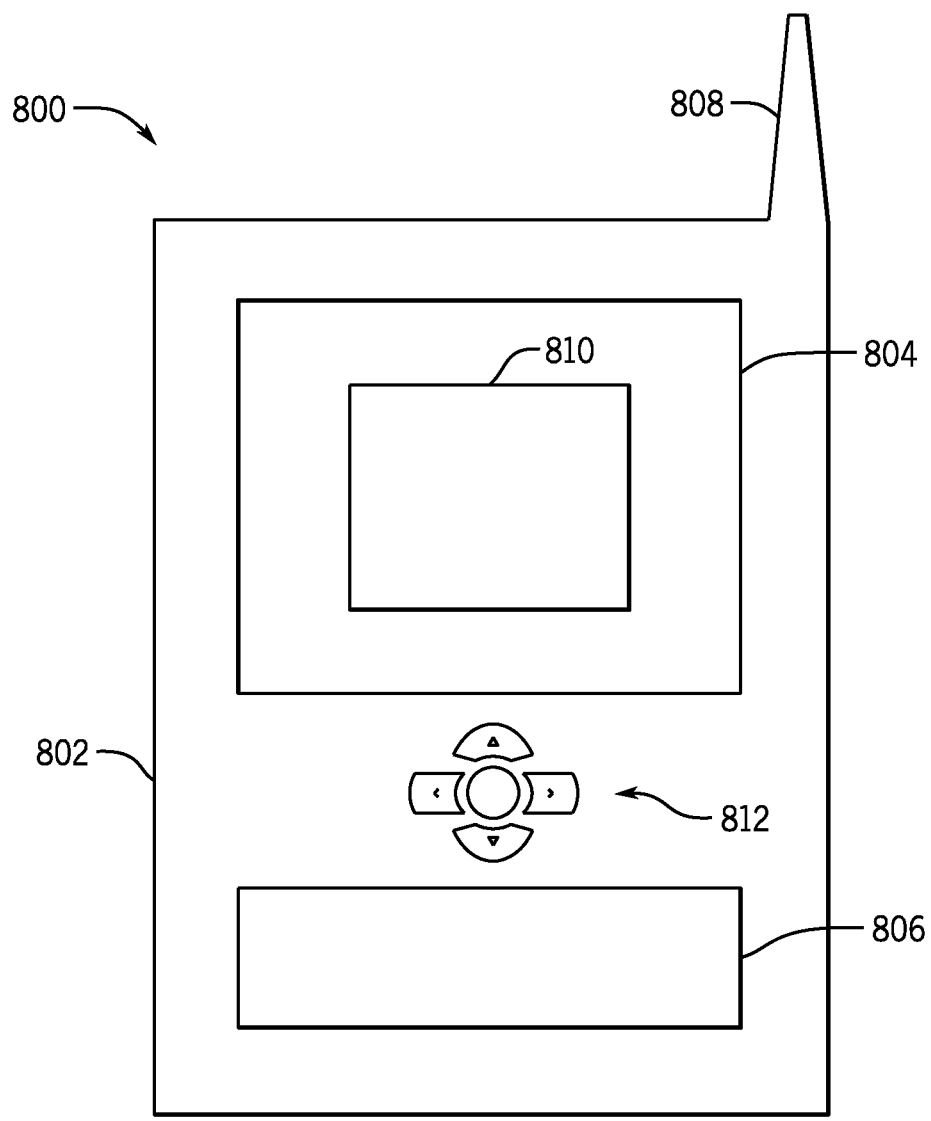
FIG. 12 is a front elevational view for one embodiment.

As shown in FIG. 12, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
using an overlap test between a screen space tile and moving triangle with per-vertex motion following a Bézier curve to report time bounds in which a moving triangle overlaps with a tile by computing scalar control points and a lower subdividable linear efficient function enclosure (SLEFE) from the control points to determine breakpoints and, if the breakpoints indicate that no overlap exists, culling the tile.

2. The method of claim 1 including searching for intersections of frustum planes against a triangle vertex moving along a Bézier curve in three dimensions.

3. The method of claim 1 including, if all three vertices are outside a frustum plane in a time interval, culling the samples within that time interval.

4. The method of claim 1 including using subdividable linear efficient function enclosures and at least two adjacent bilinear patches to bound a surface defined as the intersection of a triangle vertex and a tile frustum.

5. The method of claim 1 including determining overlap with a tile and a moving triangle edge by expressing the overlap as a polynomial expressed on Bernstein form, and if all the control points of that equation indicates that no overlap exists, culling the tile.

6. The method of claim 1 including solving for when line segments between SLEFE breakpoints, bounding a curve that represents the distance from a triangle edge and a tile corner, intersect a time axis, thereby computing time segments wherein the triangle overlaps the tile.

7. The method of claim 6 including using the obtained time segments to avoid executing samples tests outside the obtained time segments.

8. The method of claim 7 including determining a final time interval by taking an intersection of time segments computed separately.

9. One or more non-transitory computer readable media storing instructions to perform a sequence:
using an overlap test between a screen space tile and moving triangle with per-vertex motion following a Bézier curve to report time bounds in which a moving triangle overlaps with a tile by computing scalar control points and a lower subdividable linear efficient function enclosure (SLEFE) from the control points to determine breakpoints and, if the breakpoints indicate that no overlap exists, culling the tile.

10. The media of claim 9, said sequence including searching for intersections of frustum planes against a triangle vertex moving along a Bézier curve in three dimensions.

11. The media of claim 9, said sequence including if all three vertices are outside a frustum plane in a time interval, culling the samples within that time interval.

12. The media of claim 9, said sequence including using subdividable linear efficient function enclosures and at least two adjacent bilinear patches to bound a surface defined as the intersection of a triangle vertex and a tile frustum.

13. The media of claim 9, said sequence including determining overlap with a tile and a moving triangle edge by expressing the overlap as a polynomial expressed on Bernstein form, and if all the control points of that equation indicates that no overlap exists, culling the tile.

14. The media of claim 9, said sequence including solving for when line segments between SLEFE breakpoints, bounding a curve that represents the distance from a triangle edge and a tile corner, intersect a time axis, thereby computing time segments wherein the triangle overlaps the tile.

15. The media of claim 14, said sequence including using the obtained time segments to avoid executing samples tests outside the obtained time segments.

16. The media of claim 15, said sequence including determining a final time interval by taking an intersection of time segments computed separately.

17. An apparatus comprising:
a processor to use an overlap test between a screen space tile and moving triangle with per-vertex motion following a Bézier curve to report time bounds in which a moving triangle overlaps with a tile by computing scalar control points and a lower subdividable linear efficient function enclosure (SLEFE) from the control points to determine breakpoints and, if the breakpoints indicate that no overlap exists, culling the tile; and
a memory coupled to said processor.

18. The apparatus of claim 17, said processor to search for intersections of frustum planes against a triangle vertex moving along a Bézier curve in three dimensions.

19. The apparatus of claim 17, said processor to cull the samples within a time interval if all three vertices are outside a frustum plane in that time interval.

20. The apparatus of claim 17, said processor to use subdividable linear efficient function enclosures and at least two adjacent bilinear patches to bound a surface defined as the intersection of a triangle vertex and a tile frustum.

21. The apparatus of claim 17, said processor to determine overlap with a tile and a moving triangle edge by expressing the overlap as a polynomial expressed on Bernstein form, and if all the control points of that equation indicates that no overlap exists, cull the tile.

22. The apparatus of claim 17, said processor to solve for when line segments between SLEFE breakpoints, bounding a curve that represents the distance from a triangle edge and a tile corner, intersect a time axis, thereby computing time segments wherein the triangle overlaps the tile.

23. The apparatus of claim 22, said processor to use the obtained time segments to avoid executing samples tests outside the obtained time segments.

24. The apparatus of claim 23, said processor to determine a final time interval by taking an intersection of time segments computed separately.

25. The apparatus of claim 17 including an operating system.

26. The apparatus of claim 17 including a battery.

27. The apparatus of claim 17 including firmware and a module to update said firmware.

* * * * *